United States Patent

[11] 3,582,095

| [72] | Inventor | Pierre Emmanuel Eugene Jean Bogaert<br>Chalet du Dyck, Wemmel, Belgium |
|---|---|---|
| [21] | Appl. No. | 726,817 |
| [22] | Filed | May 6, 1968 |
| [45] | Patented | June 1, 1971 |
| [32] | Priority | Oct. 11, 1967 |
| [33] | | Luxembourg |
| [31] | | 54,653 |

[54] COMPOSITE JOINT
7 Claims, 3 Drawing Figs.

[52] U.S. Cl. .................................................. 277/233,
161/119, 161/120, 161/160, 161/161
[51] Int. Cl. .................................................. F16j 15/18
[50] Field of Search .......................................... 277/207 B,
227, 233 MD; 264/46, 321; 161/111, 159, 190,
252, 160, 161, 119, 120

[56] References Cited
UNITED STATES PATENTS

| 2,906,643 | 9/1959 | Dennis | 264/46 |
| 2,961,332 | 11/1960 | Nairn | 264/46X |
| 3,197,357 | 7/1965 | Schulpen | 264/321UX |
| 3,256,133 | 6/1966 | Wright et al. | 161/190X |
| 3,273,743 | 9/1966 | McColl | 277/233X |
| 3,342,911 | 9/1967 | Funahashi | 264/46 |
| 3,386,877 | 6/1968 | Skochdopole et al. | 264/321X |

Primary Examiner—Laverne D. Geiger
Assistant Examiner—Robert I. Smith
Attorney—Hopgood and Calimafde ABSTRACT: A joint to provide elasticity and moisture permeability. The joint is comprised of alternate layers of elastic open and closed-cell materials. The materials are corrugated, creating recesses in the closed-cell material which are filled with the open-cell elastic material. When the joint is compressed, the pockets of open-cell material remain permeable to moisture, while the joint retains the elasticity of the closed-cell material.

COMPOSITE JOINT

BACKGROUND

The object of the present invention is to provide a composite joint particularly adapted to all cases requiring a joint which is capable of permitting moisture to pass while permanently preserving the required properties of elasticity.

In the present state of the art, the problem of elastic joints which permits the passage of humidity or condensation liquid has not yet been solved entirely satisfactorily.

It has been proposed to use open-cell elastic joints but experience has shown that these joints rot and hence lose their elasticity. In order to avoid the rotting under the action of moisture of the open-cell material constituting the joint, it has also been proposed to impregnate the material with a non-rotting substance such as a bituminous, butyl or other solution. Experience shows that these methods retard rotting but do not completely avoid it and therefore at the end of a certain period of time, the material of the joint also loses its elastic properties.

The object of the present invention is to obviate these drawbacks by providing a composite joint which comprises both a closed-cell elastic material and an open-cell elastic material, the closed-cell material being intended permanently to maintain the required properties of elasticity while the open-cell material is intended to allow the water to filter through while remaining tight to air and dust.

SUMMARY

The joint in accordance with the invention is characterized primarily by the fact that it consists of two cellular elastic materials, one with open cells and the other with closed cells distributed along the entire joint so as to provide, in the crushed condition of the joint, at least one series of easy passages for the water through the said elastic material.

The invention will be better understood by reference to the following description and to the accompanying drawing which shows, solely by way of example, two embodiments of the invention, in which.

Figure 1:
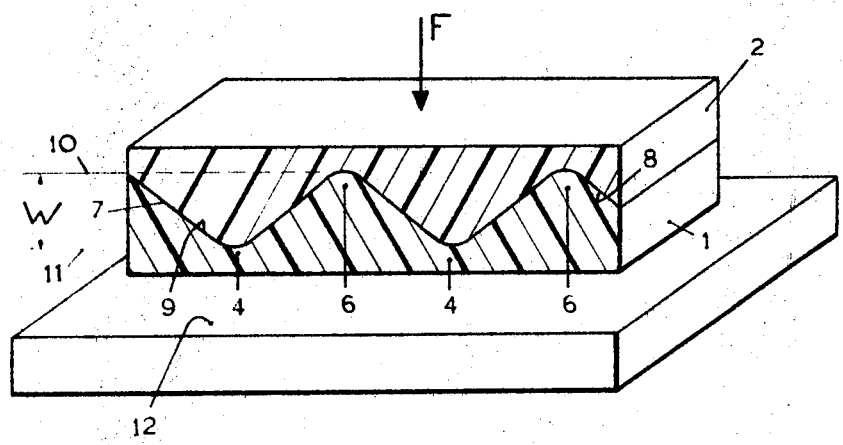
FIG. 1 is a perspective view of a composite joint of the invention having an undulated area of contact.

Referring now to FIG. 1, the lower layer 1 is composed of open-cell cellular material such as polyurethane foam. The top layer 2 is composed of closed-cell cellular material such as foam rubber, polyethylene, polyurethane, polyvinyl chloride, polystyrene, polyester, or other plastic foam.

The area of contact 7, between the layers 1 and 2 is generally sinusoidal, or undulating. The mating surface of each layer 1 and 2 includes raised portions 6 and 3, respectively, which extend into matching recesses 8 and 9 in the opposing layer. The raised portions 6 and 3 have a height W, represented by the distance between their respective base lines 10 and 11 when the joint is assembled.

When the joint is compressed by a force F, such as against a surface 12, the open cellular layer 1 will compress. The reduced thickness portions 4 of layer 1 will be compressed more than the thicker raised portions 6. Ultimately the raised portions 3 of the closed cell layer 2 will largely support the force F against surface 12, leaving the open cellular material in recesses 8 relatively less compressed, so that moisture can pass therethrough.

Figure 2:
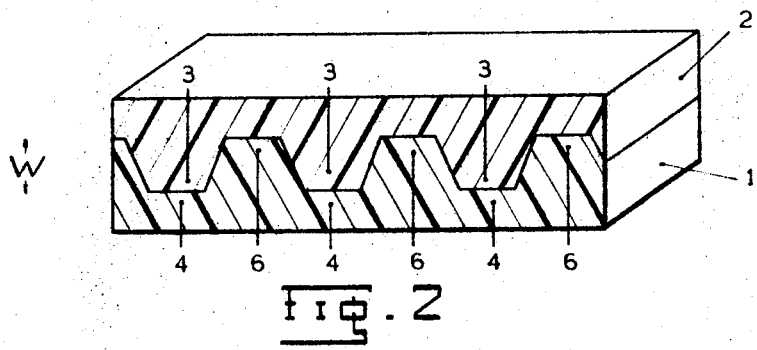
FIG. 2 is a perspective view of a composite joint of the invention having a crenellated area of contact.

The embodiment of the invention shown in FIG. 2 is similar to that of FIG. 1, and corresponding elements in the former are identified by the same reference numerals used in the latter. In FIG. 2, the area of contact between layers 1 and 2 is trapezoidal rather than sinusoidal as in FIG. 1.

Figure 3:
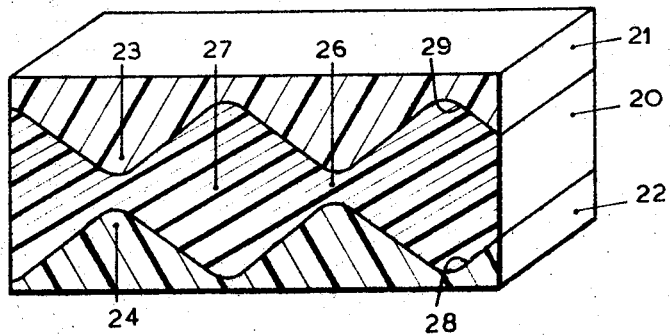
FIG. 3 is a perspective view of a three-layer composite joint according to the invention.

FIG. 3 illustrates an alternate embodiment of the invention wherein a layer of open-cell material 20 is sandwiched between two layers of closed-cell material 21 and 22. Layers 21 and 22 have raised portions 23 and 24 similar to raised portions 3 and 6 of FIG. 1. In this embodiment, the closed-cell layers 21 and 22 are placed adjacent one another with raised portions 23 and 24 juxtaposed.

The space between portions 23 and 24 is filled with open-cell material as illustrated, resulting in a layer 20 of open-cell material, which is thin at the area 26 between the raised portions 23 and 24, and is thick in area 27 between the vallies 28 and 29. When pressure is applied to the joint so formed, portions 23 and 24 will prevent compression of area 27 leaving it relatively open to the passage of moisture.

This arrangement results in a joint which retains the qualities of elasticity and permeability for a much longer period of time. The open-cell cellular material permanently retains its properties of permeability while the closed-cell cellular material permanently retains its properties of elasticity.

If the open-cell material rots, it loses merely its quality of elasticity, which is not predominant in the elasticity of the joint, while it retains its properties of permeability. The closed-cell material contributes the properties of elasticity to the joint, and since it is impermeable to water it is incapable of rotting. The properties of elasticity and permeability of the joint are therefore constantly maintained.

The shape of the connecting surface is obviously not limited to the shapes shown by way of example in the drawing, as long as there are present recurrently in the joint, areas of strong resistance to compression which take up the greater part of the compressive force so as to provide zones of high permeability which permit ready passage of the water.

The joint of the invention finds particular application in plastic lanterns, and in particular in floating-mount lanterns which require a joint of permanent constant elasticity capable of assuring a perfect seal for the wind, dust, rain and snow, while water of condensation can readily be evacuated through the said joint.

It will thus be understood that the joint which forms the object of the present invention applies to all fluids and that it need not necessarily be formed of two or more materials but that it can be made of different layers of one and the same material at least one of which permits the passage of a liquid through its texture.

The invention has been described and illustrated solely by way of illustration and not of limitation and it goes without saying that numerous modifications may be made therein without going beyond its spirit.

I claim:

1. A composite joint comprising first and second layers, one of said layers overlying the other of said layers, said layers defining an undulating interface along their area of contact, one of said layers being composed of a cellular material having closed cells, and the other of said layers being composed of a cellular material having open cells, the arrangement of said first and second layers providing areas of alternating thickness of said first and second layers thereby defining, in the compressed state of said joint, a first series of alternating passages permitting the relatively easy passage of fluid therethrough, and a second series of alternating areas of relatively high resistance to compression.

2. The composite joint of claim 1, further comprising a third layer of closed-cell material arranged in contact with the surface of said open-cell material layer opposed to the surface of the latter contacting said first-mentioned closed-cell material layer, and defining with said open-cell material layer a second undulating interface defining areas of alternating thickness of said open-cell material layer between said two layers of closed-cell material.

3. Composite joint according to claim 1, characterized by the fact that it is formed of cellular elastic materials, one of high elastic resistance with closed cells and another of low elastic resistance with open cells, distributed along the entire joint in layers assembled along one or more longitudinal connecting surfaces, the intersection of which with the vertical longitudinal plane is in the general shape of sinusoids so as to provide, in the compressed condition of the joint an alternation of zones of high resistance to compression between which there are arranged zones in which the force of compression exerts less stress permitting a less compressed condition of the open-cell material and therefore easy passages for a fluid.

4. Composite joint according to claim 1 characterized by the fact that it is composed of cellular elastic materials one with open cells and another with closed cells distributed along the entire joint in layers assembled along one or more longitudinal connecting surfaces, the intersection of which with a vertical longitudinal plane is a broken trapezoidal line so as to provide in the compressed condition of the joint an alternation of zones of high resistance to compression between which there are zones of easy passage for water.

5. Composite joint according to claim 1 characterized by the fact that the open-cell porous elastic material is polyurethane.

6. Composite joint according to claim 1 characterized by the fact that the closed-cell elastic material is a polyethylene.

7. Composite joint according to claim 1 characterized by the fact that the closed-cell elastic material is foam rubber.